United States Patent
Haubrich et al.

(10) Patent No.: US 10,453,458 B2
(45) Date of Patent: *Oct. 22, 2019

(54) METHOD AND APPARATUS FOR USING HEARING ASSISTANCE DEVICE AS VOICE CONTROLLER

(71) Applicant: Starkey Laboratories, Inc., Eden Prairie, MN (US)

(72) Inventors: Gregory John Haubrich, Champlin, MN (US); Sasidhar Vajha, Liague City, TX (US); Jon S. Kindred, Minneapolis, MN (US); Andrew Joseph Johnson, Edina, MN (US); Alexander Botz, Minnetonka, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/934,248

(22) Filed: Mar. 23, 2018

(65) Prior Publication Data

US 2018/0211667 A1      Jul. 26, 2018

Related U.S. Application Data

(63) Continuation of application No. 14/864,820, filed on Sep. 24, 2015, now Pat. No. 9,940,928.

(51) Int. Cl.
*H04R 25/00* (2006.01)
*G10L 15/22* (2006.01)
*H04L 12/28* (2006.01)

(52) U.S. Cl.
CPC ............ *G10L 15/22* (2013.01); *H04L 12/282* (2013.01); *H04R 25/554* (2013.01); *H04R 25/558* (2013.01); *G10L 2015/223* (2013.01); *H04R 25/407* (2013.01); *H04R 25/505* (2013.01); *H04R 2225/55* (2013.01); *H04R 2420/07* (2013.01)

(58) Field of Classification Search
CPC ....... H04R 25/00; H04R 25/55; H04R 25/558
USPC .......................................... 381/312, 314–315
See application file for complete search history.

(56) References Cited

U.S. PATENT DOCUMENTS

| | | |
|---|---|---|
| 5,086,385 A | 2/1992 | Launey et al. |
| 5,636,285 A | 6/1997 | Sauer |
| 5,721,783 A | 2/1998 | Anderson |
| 6,021,207 A | 2/2000 | Puthuff et al. |

(Continued)

OTHER PUBLICATIONS

"U.S. Appl. No. 14/864,820, Preliminary Amendment filed Apr. 5, 2016", 3 pgs.

(Continued)

*Primary Examiner* — Suhan Ni
(74) *Attorney, Agent, or Firm* — Schwegman Lundberg & Woessner, P.A.

(57) ABSTRACT

A system for communication between one or more remotely controllable devices and a hearing assistance device includes a gateway device. The hearing assistance device detects voice commands issued by its wearer. The gateway device wirelessly communicates with the hearing assistance device, produces one or more control signals based on the voice commands, and routes the one or more control signals to one or more devices selected from the one or more remotely controllable devices according to the voice command.

20 Claims, 8 Drawing Sheets

(56) References Cited

U.S. PATENT DOCUMENTS

| | | | |
|---|---|---|---|
| 6,112,103 A * | 8/2000 | Puthuff | H04M 1/247 |
| | | | 455/550.1 |
| 6,496,107 B1 * | 12/2002 | Himmelstein | B60R 25/257 |
| | | | 340/426.1 |
| 6,988,070 B2 | 1/2006 | Kawasaki et al. | |
| 7,062,223 B2 | 6/2006 | Gerber et al. | |
| 7,457,426 B2 | 11/2008 | Drtina | |
| 7,464,035 B2 | 12/2008 | Funk et al. | |
| 7,751,578 B2 | 7/2010 | Arz et al. | |
| 7,778,432 B2 | 8/2010 | Larsen | |
| 7,860,262 B2 | 12/2010 | Drtina | |
| 7,929,713 B2 | 4/2011 | Victorian et al. | |
| 8,150,044 B2 | 4/2012 | Goldstein et al. | |
| 8,165,329 B2 | 4/2012 | Bisgaard | |
| 8,169,938 B2 | 5/2012 | Duchscher et al. | |
| 8,340,975 B1 | 12/2012 | Rosenberger | |
| 8,494,198 B2 | 7/2013 | Aldaz et al. | |
| 8,526,649 B2 | 9/2013 | Foo et al. | |
| 8,724,639 B2 | 5/2014 | Mahmoud | |
| 8,760,284 B2 | 6/2014 | Petersen et al. | |
| 8,761,421 B2 | 6/2014 | Apfel | |
| 8,804,988 B2 | 8/2014 | Solum et al. | |
| 8,811,639 B2 | 8/2014 | Solum et al. | |
| 8,868,137 B2 | 10/2014 | Hicks, III | |
| 9,794,701 B2 | 10/2017 | Flood et al. | |
| 9,940,928 B2 | 4/2018 | Haubrich et al. | |
| 2002/0067839 A1 | 6/2002 | Heinrich | |
| 2004/0203387 A1 | 10/2004 | Grannan | |
| 2005/0071879 A1 | 3/2005 | Haldavnekar et al. | |
| 2005/0272477 A1 | 12/2005 | Boykins et al. | |
| 2006/0080408 A1 | 4/2006 | Istvan | |
| 2006/0245609 A1 | 11/2006 | Arz et al. | |
| 2007/0060118 A1 | 3/2007 | Guyette | |
| 2007/0298758 A1 | 12/2007 | Verma et al. | |
| 2008/0111677 A1 | 5/2008 | Kolz et al. | |
| 2009/0010466 A1 | 1/2009 | Haikonen | |
| 2009/0074216 A1 | 3/2009 | Bradford et al. | |
| 2009/0076816 A1 | 3/2009 | Bradford et al. | |
| 2009/0115653 A1 | 5/2009 | Katrak et al. | |
| 2010/0067723 A1 | 3/2010 | Bergmann et al. | |
| 2010/0158292 A1 | 6/2010 | Pedersen | |
| 2011/0119062 A1 | 5/2011 | Dohan | |
| 2011/0211584 A1 | 9/2011 | Mahmoud | |
| 2012/0134507 A1 | 5/2012 | Dimitriadis et al. | |
| 2012/0169454 A1 | 7/2012 | Petersen et al. | |
| 2012/0171987 A1 | 7/2012 | Newman | |
| 2012/0213393 A1 | 8/2012 | Foo et al. | |
| 2012/0275628 A1 | 11/2012 | Pedersen et al. | |
| 2012/0310394 A1 | 12/2012 | El-hoiydi | |
| 2014/0064528 A1 | 3/2014 | Flood et al. | |
| 2014/0233774 A1 | 8/2014 | Kim et al. | |
| 2014/0303687 A1 * | 10/2014 | Wall, III | A61F 9/08 |
| | | | 607/54 |
| 2014/0341408 A1 | 11/2014 | Varghese et al. | |
| 2015/0163602 A1 | 6/2015 | Pedersen et al. | |

OTHER PUBLICATIONS

"U.S. Appl. No. 13/601,602, Advisory Action dated Apr. 24, 2015", 4 pgs.

"U.S. Appl. No. 13/601,602, Advisory Action dated Nov. 4, 2016", 3 pgs.

"U.S. Appl. No. 13/601,602, Final Office Action dated May 22, 2015", 17 pgs.

"U.S. Appl. No. 13/601,602, Final Office Action dated Aug. 5, 2016", 16 pgs.

"U.S. Appl. No. 13/601,602, Non Final Office Action dated Jan. 15, 2015", 13 pgs.

"U.S. Appl. No. 13/601,602, Non Final Office Action dated Apr. 11, 2016", 14 pgs.

"U.S. Appl. No. 13/601,602, Non Final Office Action dated Dec. 23, 2016", 16 pgs.

"U.S. Appl. No. 13/601,602, Notice of Allowance dated Jun. 20, 2017", 7 pgs.

"U.S. Appl. No. 13/601,602, Response filed Mar. 22, 2017 to Non Final Office Action dated Dec. 23, 2016", 7 pgs.

"U.S. Appl. No. 13/601,602, Response filed Apr. 15, 2015 to Non Final Office Action dated Jan. 15, 2015", 11 pgs.

"U.S. Appl. No. 13/601,602, Response filed Jul. 11, 2016 to Non Final Office Action dated Apr. 11, 2016", 12 pgs.

"U.S. Appl. No. 13/601,602, Response filed Aug. 24, 2015 to Final Office Action dated May 22, 2015", 13 pgs.

"U.S. Appl. No. 13/601,602, Response filed Oct. 5, 2016 to Final Office Action dated Aug. 5, 2016", 12 pgs.

"U.S. Appl. No. 13/601,602, Response filed Oct. 22, 2015 to Advisory Action dated Sep. 24, 2015", 13 pgs.

"U.S. Appl. No. 14/450,041, Advisory Action dated Aug. 10, 2016", 5 pgs.

"U.S. Appl. No. 14/450,041, Final Office Action dated May 9, 2016", 13 pgs.

"U.S. Appl. No. 14/450,041, Final Office Action dated Sep. 1, 2017", 14 pgs.

"U.S. Appl. No. 14/450,041, Non Final Office Action dated Mar. 1, 2017", 14 pgs.

"U.S. Appl. No. 14/450,041, Non Final Office Action dated Nov. 23, 2015", 10 pgs.

"U.S. Appl. No. 14/450,041, Response filed Feb. 23, 2016 to Non Final Office Action dated Nov. 23, 2015", 10 pgs.

"U.S. Appl. No. 14/450,041, Response filed Jun. 1, 2017 to Non Final Office Action dated Mar. 1, 2017", 17 pgs.

"U.S. Appl. No. 14/450,041, Response filed Jul. 11, 2016 to Final Office Action dated May 9, 2016", 11 pgs.

"U.S. Appl. No. 14/864,820, Final Office Action dated Apr. 19, 2017", 10 pgs.

"U.S. Appl. No. 14/864,820, Non Final Office Action dated Aug. 12, 2016", 8 pgs.

"U.S. Appl. No. 14/864,820, Notice of Allowability dated Feb. 23, 2018", 9 pgs.

"U.S. Appl. No. 14/864,820, Notice of Allowance dated Aug. 7, 2017", 5 pgs.

"U.S. Appl. No. 14/864,820, Notice of Allowance dated Nov. 24, 2017", 5 pgs.

"U.S. Appl. No. 14/864,820, Response filed Jul. 19, 2017 to Final Office Action dated Apr. 19, 2017", 10 pgs.

"U.S. Appl. No. 14/864,820, Response filed Dec. 12, 2016 to Non Final Office Action dated Aug. 12, 2016", 12 pgs.

"European Application Serial No. 16190551.8, Extended European Search Report dated Feb. 15, 2017", 7 pgs.

* cited by examiner

METHOD AND APPARATUS FOR USING HEARING ASSISTANCE DEVICE AS VOICE CONTROLLER

CROSS REFERENCE TO RELATED APPLICATIONS

This application is a continuation of U.S. patent application Ser. No. 14/864,820, filed Sep. 24, 2015, which is incorporated by reference herein in its entirety.

The present application is related to U.S. application Ser. No. 14/450,041, entitled "METHOD AND APPARATUS FOR CONVEYING INFORMATION FROM HOME APPLIANCES TO A HEARING ASSISTANCE DEVICE", filed Aug. 1, 2014, which is a Continuation-in-Part (OP) of and claims the benefit of priority under 35 U.S.C. § 120 to U.S. application Ser. No. 13/601,602, entitled "GATEWAY FOR A WIRELESS HEARING ASSISTANCE DEVICE", filed Aug. 31, 2012, which are incorporated by reference herein in their entireties.

TECHNICAL FIELD

The present subject matter relates generally to hearing assistance devices, and more particularly to a system including a gateway that allows one or more devices to be voice-controlled using a wireless hearing assistance device.

BACKGROUND

Modern hearing assistance devices, such as hearing aids, typically include digital electronics to enhance the wearer's listening experience. Hearing aids are electronic instruments worn in or around the ear to compensate for hearing losses by specially amplifying sound. Hearing aids use transducer and electro-mechanical components which are connected via wires to the hearing aid circuitry.

Modern hearing assistance devices may include wireless communication capabilities for receiving signals from and/or transmitting signals to various devices, such as telephones and entertainment devices equipped with audio transmitter or streamer. Automation systems have been introduced, for example into homes to allow remote control of various home electrical and electronic devices which may include the devices communicating with a hearing assistance devices. Thus, the hearing assistance device may increasingly become part of a system or network of various types of devices.

SUMMARY

A system for communication between one or more remotely controllable devices and a hearing assistance device includes a gateway device. The hearing assistance device detects voice commands issued by its wearer. The gateway device wirelessly communicates with the hearing assistance device, produces one or more control signals based on the voice commands, and routes the one or more control signals to one or more devices selected from the one or more remotely controllable devices according to the voice command.

In one embodiment, the system includes the gateway device and one or more automation controllers. The gateway device includes a communication circuit and a control signal generator. The communication circuit receives a command signal from the hearing assistance device via a wireless communication link. The command signal is representative of a voice command detected by the hearing assistance device. The control signal generator generates the one or more control signals based on the voice command. The one or more automation controllers are communicatively coupled to the gateway device and communicatively coupled to the one or more remotely controllable devices, and receive the one or more control signals and control the one or more remotely controllable devices using the one or more control signals.

In one embodiment, a method for controlling one or more remotely controllable devices using a hearing assistance device is provided. A command signal is received using a gateway device. The command signal is wirelessly transmitted from the hearing assistance device and representative of a voice command. One or more control signals are generated based on the voice command. The one or more remotely controllable devices are controlled using the one or more control signals.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various"

embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter relates generally to hearing assistance devices, and more particularly to a gateway for a wireless hearing assistance device. The hearing assistance devices referred to herein include, but are not limited to hearing aids. One aspect of the present subject matter relates to an apparatus for wireless communication with a hearing assistance device. The apparatus includes one or more inputs configured to receive messages and alerts directed to a wearer of a hearing assistance device. A processor is configured to process the messages and alerts to obtain an output adapted to be played via audio to a wearer of the hearing assistance device, and to interrupt a current audio stream being played to the wearer. A wireless transmitter is configured to transmit the output to the hearing assistance device, in various embodiments. In still another embodiment the processor within the hearing assistance device itself is programmed to detect and process audio alarms and other audio alerts and under those circumstances can attenuate the wireless audio stream or other acoustic audio input and alert the wearer of an alarm or alert either by amplifying the alert or by playing an audio alert equivalent to the alarm or alert being acoustically played.

A hearing assistance device with wireless communication capability (or wireless hearing assistance device) allows for new services to be offered to the wireless hearing assistance device user, or wearer. The present subject matter provides for alarms, doorbells, audio messages and text messages to be sent to the hearing assistance device user. To enable these services, an entry to the wireless hearing assistance device is required. Currently a TV streamer offers a level of access into the hearing aid for remote control message forwarding. This subject matter allows for other messages, alarms and alerts to be forwarded to the hearing assistance device user. The messages and alerts are collected by a gateway device, in one embodiment. The gateway device is enabled with a wireless link to the hearing assistance device user, in various embodiments. The hearing assistance device user would receive the messages, alerts and alarms over the wireless link. The hearing assistance device would play the audible message, alert or alarm to the hearing assistance device user. In various embodiments, the gateway device has multiple inputs (wired and/or wireless) for alarms, audio input, doorbells, etc. In one embodiment, messages are sent directly to the hearing assistance device from the gateway device. Alternatively, messages can be sent from a gateway device to an accessory device which forwards the message to the hearing assistance device. In an embodiment, messages are sent from a gateway device to a TV streamer device, where they are mixed with the audio stream by a processor (such as a digital signal processor). Messages are sent via CVSD (continuously variable slope delta modulation), G.722, G.726, AAC or other appropriate audio encoding format that can be decoded by the hearing assistance device, in various embodiments.

In various embodiments, accessories such as TV streamers, wireless audio streaming devices, cell phone interfaces, remote controls, gateways and the like can incorporate a microphone input for the purpose of "listening" for alarms. Alarms such as fire, burglar, CO, etc. and alerts such as a doorbell, weather alert, etc. can be activated when a hearing aid wearer is in the process of listening to digital audio inputs from accessory devices which will further impair the user from hearing these household alarms or alerts. In addition, a user would be less likely to hear an incoming telephone call or doorbell when steaming audio via an accessory device. The wireless accessories or dedicated accessory or audio gateway type devices can be equipped with a microphone, in an embodiment. The microphone is used as an input to monitor the ambient acoustic environment to determine if an alarm is sounding. The unit can be put in a training mode before being deployed for use to "learn" the alarm sounds so that each can be distinguished and then unique alerts can be sent to the hearing aid wearer for each alarm, or a generic alert can be sent just to alert the wearer that an alarm is sounding or a phone is ringing. In various embodiments, acoustic inputs being wirelessly forwarded to hearing instruments from accessory devices. Accessory devices may include cell phones or smart phones having wireless communication capability such as 802.11 (WIFI), Bluetooth or other means of wireless communication with a hearing instrument.

It would also be possible to add this feature to hearing aids as well and bypass the accessories. While streaming, the microphone input can still be monitored for critical alarms going off in the acoustic environment, the microphone input can go active and the wireless input can be muted to help aid the patient in hearing the alarm or be alerted to the alarm. Acoustic alarms can also be translated into voice alerts for the hearing instrument wearer, in an embodiment.

A hearing impaired user of a hearing assistance device can become involved with watching TV or other content on a streamer device, and the microphone audio would be attenuated. Both of these factors make it such that the hearing assistance device user might not notice a doorbell, a fire alarm or other serious alert that the hearing assistance device user should be made aware of. Additionally, a spouse, family member or lieind might want to talk to the hearing assistance device user while they are watching the movie or otherwise not readily paying attention. The present subject matter would also allow for a method to enable a conversation with the hearing assistance device user while the person is in a stream.

The subject matter is intended to be able to get an audible message to the hearing assistance device user. The message is sent to the hearing assistance device user via the wireless link such that the signal is amplified and made audible for the hearing assistance device wearer, in various embodiments. Alternatively, the message can be relayed through a device like a streamer or other accessory, where the message can be mixed with the audio stream.

In various embodiments, a hearing impaired user might have the volume reduced on their assisted listening device, or the assisted listening device might be in a program to attenuate the hearing assistance device. When the alert comes in, the gateway can pass a data message to increase the volume of the assisted listening device to a normal level, thus overriding attenuated volume settings.

Previously, lights have been used to alert hearing impaired users to alarms or alerts. Otherwise loud volume is required to capture the audio link and to get to the hearing assistance device wearer. The previous solutions do not allow for a multitude of alerts/message sources to be funneled to the hearing assistance device user. The present subject matter allows for multiple inputs from the appropriate sources to all be collected, mixed/processed and sent to the hearing assistance device user through wireless transmission. The messages are then played via audio to the user. Using a streamer presents a new scenario where the hearing impaired might not pay attention to his or her surroundings as they might have previously. This subject matter gets the information to the hearing impaired user, promoting safety in the case of alarms or conveying information to the hearing impaired individual so that they get the message.

One embodiment of the present subject matter includes a gateway as a standalone device to receive the inputs and transmit them wirelessly to the hearing assistance device. Alternatively a computer or smart phone can be configured to accept inputs from various sources, and software on the computer can route the message to a wireless dongle or built in wireless device. The signal can then be sent to the hearing assistance device user directly or via a cellular phone/ entertainment device (CPED), TV streamer or other device in wireless communication with the hearing assistance device. A CPED is used to send audio streaming or cell phone audio to the hearing assistance device user. The cell phone can also receive messages via SMS services or via Bluetooth® or other wireless interface. When a CPED is used as a gateway, the cell phone can send the message via Bluetooth® to the CPED, where it can be mixed with other audio signals and sent to the hearing assistance device. When a smart phone or cell phone is used as the gateway device, the signals can be sent directly to the hearing instrument via wireless communication such as 802.11, Bluetooth, Bluetooth low energy or other wireless means.

In various embodiments, the present subject matter provides for training the gateway device by placing the device into a learning mode for each audible alarm within the user's home. For example, the gateway device can be placed in "learn fire alarm" mode and then a fire alarm is set off using the test button on the fire alarm device. This alarm is recorded and statistics of the sound would be analyzed by the gateway device so if it heard the alarm again while in normal operation it can forward a voice command to the hearing assistance device, or it can send a fire alarm message to the hearing assistance device where a locally generated alert can be synthesized on the hearing assistance device itself. The learning mode can be used for all other household alarms of telephone rings, burglar alarms, carbon monoxide (CO) alarms, smoke detectors, weather alerts, etc. Various embodiments provide for automatic detection of fire alarm sounds (using an ANSI standard, for example). In another embodiment the hearing device itself can be trained to analyze such alerts and understand when to mute the stream and play the alarm or alert or an alarm or alert equivalent notification. In various embodiments, the present subject matter is used in a public multi-cast system. As a wearer of a hearing assistance device comes in the vicinity of a public broadcast service, the streaming audio from the broadcast service can be transmitted via wireless link for reception, in various embodiments.

Another aspect of the present subject matter relates to communication between one or more home appliances and a hearing assistance device through the gateway device. A hearing aid user can run into issues with devices that produce audio signals to indicate their states. For example, a microwave oven may beep upon completion of a cooking task, but the beep can be difficulty to hear by a hearing aid user, particularly when the hearing aid user is listening to audio streamed to the hearing aid. One approach to addressing this difficulty is to have each of the home appliance devices communicate directly to the hearing aid. However, this requires every device to include an additional feature to make it hearing aid compatible. Lacking of coordination between the devices may lead to unreliability within a system with multiple devices independently communicating with a hearing aid regarding their operational states. The present subject matter provides a system that uses a hub device for the devices communicating with the hearing aid, such as a home automation hub that is configured to communicate with one or more home appliances.

In various embodiments, the hub device collects information from one or more home appliances and relays the information to the gateway device, which processes the information and transmits the processed information to a hearing assistance device such as a hearing aid. In various embodiments, open systems, such as the Internet and a home automation hub, are utilized to interface with the gateway device installed with proprietary software, such as an application running on an Android or iOS smartphone, which in turn connects with the hearing assistance device to update the user about the state of each appliance in his/her home. In various embodiments, an open communication protocol may also be utilized to allow the gateway device to connect to multiple smart home systems.

By allowing all communications from appliances to go through a single hub, the present subject matter eliminates the need for each individual appliance to have the capability of communicating with the hearing assistance device directly. This also provides the hearing assistance device with better and much wider access to the state of multiple appliances in a house.

Still another aspect of the present subject matter relates to a system that allows for voice control of remotely controllable devices using a hearing assistance device through the gateway device. In various embodiments, the gateway device provides an interface between the user of the hearing assistance device, such as a hearing aid wearer, and the remotely controllable devices to allow the user to control operation of each of the devices using voice and/or receive audible notifications of status of operation of each of the devices.

Many devices or systems remotely controlled by electrical, electronic, optical, or radio/wireless links require a user interface. Some user interfaces may allow a user to use hands, for example to flip a switch, adjust a control, push a button, or touch a touchpad or touchscreen. Some user interfaces may allow the user to use voice commands in place of the hands. The present subject matter provides a user, such as a hearing aid wearer, with a hands-free solution for remotely controlling devices and/or systems that would free-up not only the hands, but also the eyes of the user. In various embodiments, the present subject matter allows the hearing aid wearer to control the devices and/or systems by using a hearing aid verbal command/uplink gateway. The gateway may communicate to the hearing aid via a wireless communication link that allows for multi-tasking without requiring the hearing aid wearer to wear or stay close to an additional device, so that the hearing aid user may be unencumbered in using the present system. In various embodiments, the gateway may allow for controlling one or more devices directly and/or serve as a nexus or hub for controlling many devices to achieve various types of automation such as home automation, vehicular automation, office automation, factory automation, or personal area network automation/control.

In various embodiments, the present system can be implemented in an audio system such as an assisted listening device (ALD) system and provides closed-loop control of various devices, including collecting information from the devices to provide the user with state of operation of each of the devices, such as in the forms of alert, notification, and/or feedback, and allowing the user to control the operation of each of the devices using voice commands. For example, the user may issue a voice command to adjust a particular function of a device, and receive a signal confirming the adjustment of that particular function. The user may also receive from the device a signal indicating a state of operation of that device and prompting the user to issue a voice command to change that state of operation.

In various embodiments, the hearing aid may interpret verbal commands received from the hearing aid wearer or may relay the received verbal commands to another device to interpret. Biometrics and/or unique voice metrics may be used to identify the hearing aid wearer for security. Subvocalization and/or bone conduction from the hearing aid wearer may be detected to receive the verbal command for privacy. In various embodiments, the present system may be trained for accepting custom commands and/or recognition of voice of the hearing aid wearer. In various embodiments, such voice recognition prevents background noise (including speech of people other than the hearing aid wearer) from being recognized as valid verbal commands, and prevents the present system from being operated by an unauthorized person.

In various embodiments, the hearing aid once authenticating the wearer via voice recognition, finger-print readers built into the shell of the hearing aid, and/or other biometrics, can then serve as a security device that allows the wearer streamlined access to homes, home-automation controls, automobiles, cellphones, computer, or any other electronically interfaced device requiring security. This will significantly reduce time and hassle for providing physical keys and/or passwords to various electronically controlled systems with security provisions.

Figure 1:
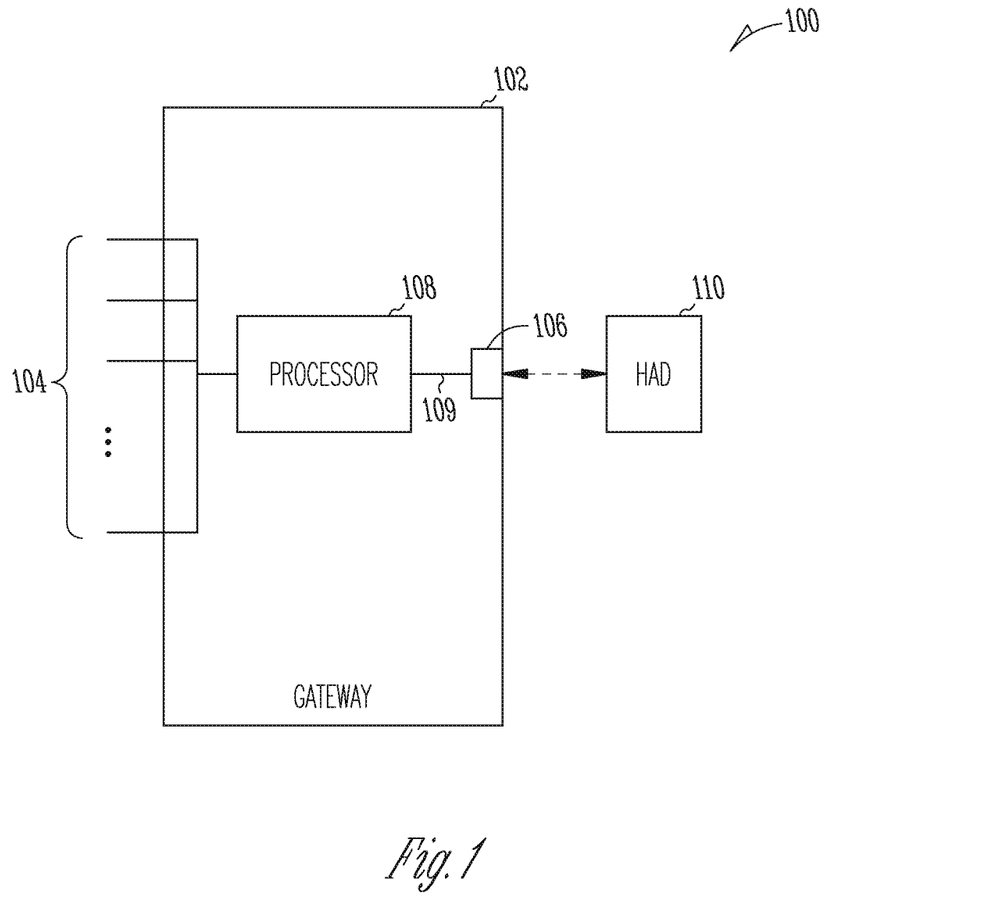
FIG. 1 illustrates a block diagram of a system for wirelessly communicating with a hearing assistance device, according to one embodiment of the present subject matter.

FIG. 1 illustrates a block diagram of a system for wirelessly communicating with a hearing assistance device, according to one embodiment of the present subject matter. The system 100 includes an apparatus 102, such as a gateway, for wireless communication with a hearing assistance device (HAD) 110. The apparatus 102 includes one or more inputs/outputs 104 configured to receive messages and alerts directed to a wearer of a hearing assistance device. A processor 108 is configured to process the messages and alerts to obtain an output 109 adapted to be played via audio to a wearer of the hearing assistance device, and to interrupt a current audio stream being played to the wearer. A wireless transmitter 106 is configured to transmit the output to the HAD 110, in various embodiments.

In various embodiments, apparatus 102 includes one or more of the interface embodiments demonstrated in U.S. Pat. No. 8,169,938, "COMMUNICATION SYSTEM FOR WIRELESS AUDIO DEVICES", assigned to Starkey Laboratories, Inc., which is incorporated by reference herein in its entirety.

Figure 2:
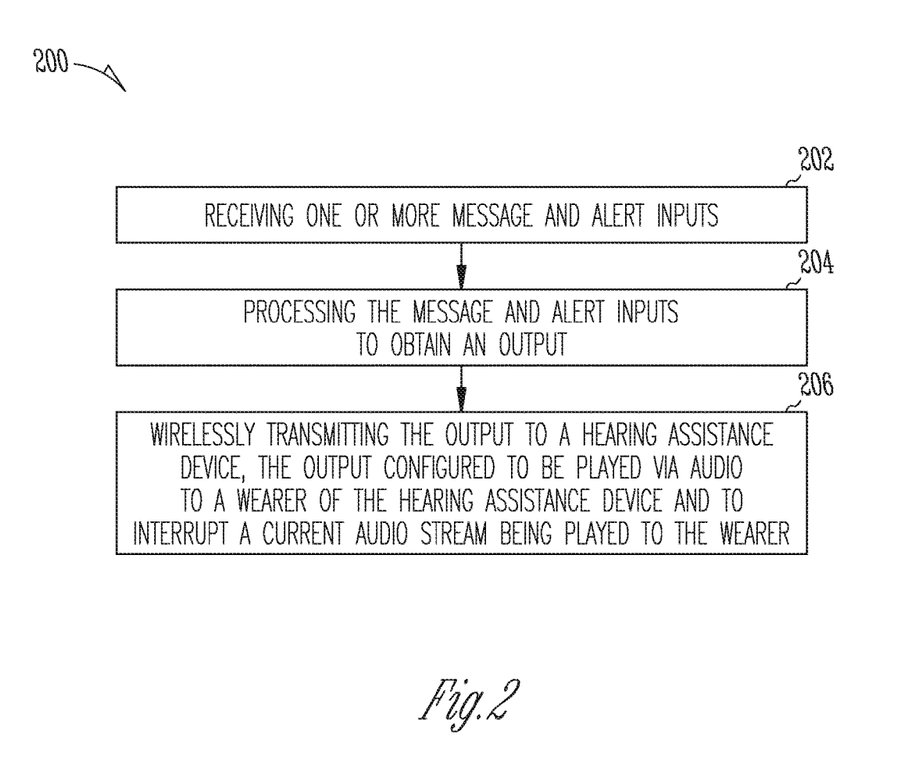
FIG. 2 illustrates a flow diagram of a method for wirelessly communicating with a hearing assistance device, according to one embodiment of the present subject matter.

FIG. 2 illustrates a flow diagram of a method 200 for wirelessly communicating with a hearing assistance device, according to one embodiment of the present subject matter. At 202, one or more message and alert inputs are received and the message and alert inputs are processed to obtain an output, at 204. At 206, the output is wirelessly transmitted to a hearing assistance device, and the output is configured to be played via audio to a wearer of the hearing assistance device and to interrupt a current audio stream being played to the wearer, in various embodiments.

In various embodiments, a method of using a hearing assistance device is provided. The hearing assistance device includes a microphone and a processor and is adapted to be worn by a wearer, in an embodiment. The method includes analyzing an acoustic input to the microphone using the processor to determine whether the acoustic input includes an alarm indication or other alert, and attenuating a wired or wireless audio stream input to the hearing assistance device to alert the wearer about the alarm indication or other alert, in various embodiments.

Figure 3:
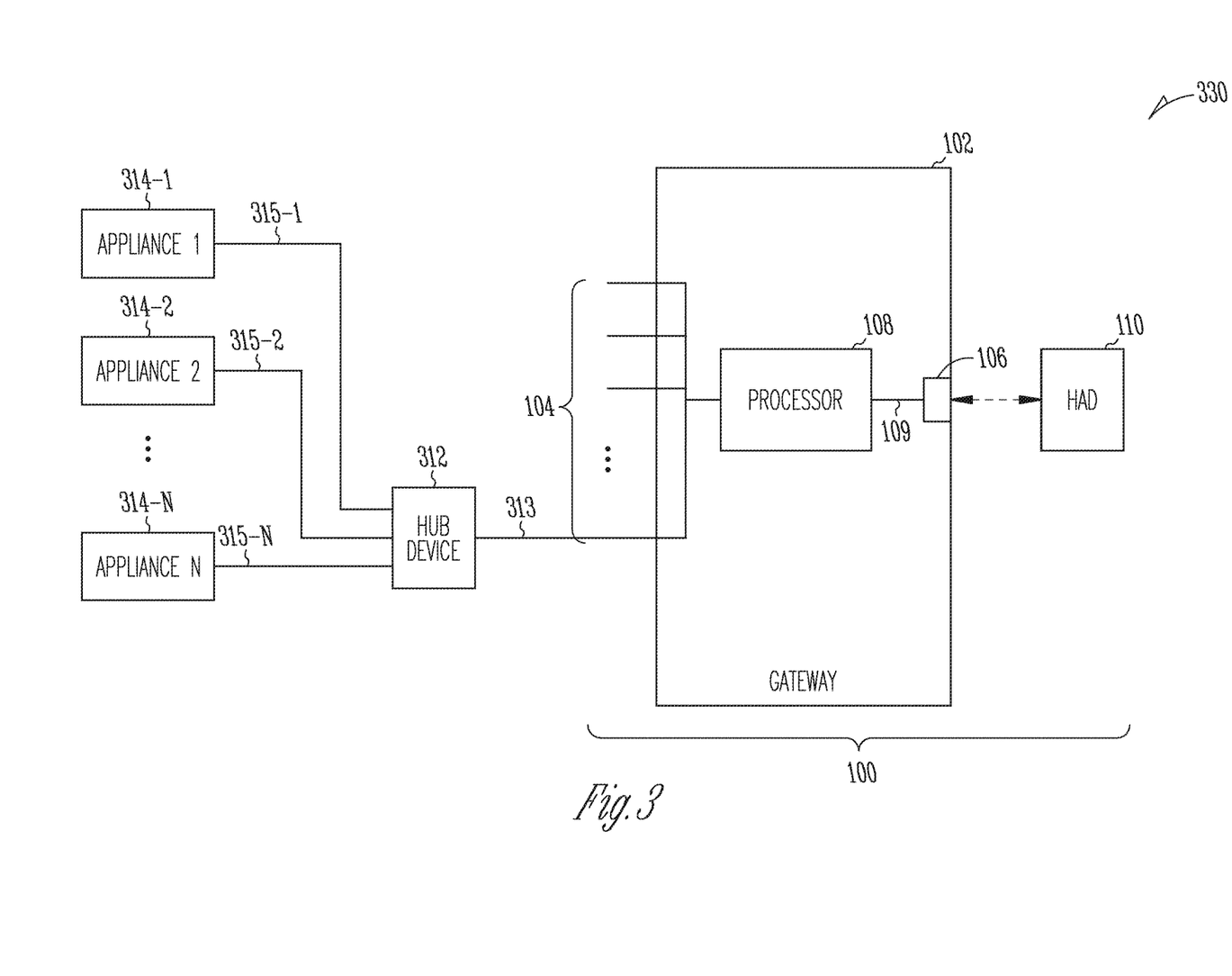
FIG. 3 illustrates a block diagram of a system providing for wireless communication from one or more home appliances to a hearing assistance device, according to one embodiment of the present subject matter.

FIG. 3 illustrates a block diagram of a system 330 providing for wireless communication from one or more home appliances to a hearing assistance device, according to one embodiment of the present subject matter. System 330 includes a hub device 312 providing for an interface between one or more home appliances 314 and system 100, thus allowing for communication from one or more home appliances 314 to a wearer of HAD 110. While a plurality of home appliances 314-1 to 314-N is shown in FIG. 3 for illustrative purposes, one or more home appliances 314 may include any number of home appliances (i.e., N≥1). Examples of one or more home appliances 314 include, but are not limited to, range, oven, microwave oven, refrigerator, toaster, coffee maker, dishwasher, laundry washer, and laundry dryer.

In various embodiments, one or more home appliances 314 are each configured to transmit status information via one of one or more communication links 315. Appliance 314-1 is communicatively coupled to hub device 312 via communication link 315-1, appliance 314-2 is communicatively coupled to hub device 312 via communication link 315-2 . . . , and appliance 314-N is communicatively coupled to hub device 312 via communication link 315-N. In one embodiment, one or more home appliances 314 are each configured to transmit status information wirelessly using an open communication protocol. Examples of the open communication protocol include Zigbee, Z-wave, Bluetooth, Bluetooth Low Energy (BLE), Bluetooth Basic Rate (BR), WiFi, any other Internet of Things (IOT) protocols, protocols from the IEEE 802.11 and IEEE 802.15 family of standards, and proprietary protocols . . . . The status information is indicative of a status of the each home appliance. Examples of such status information include, but are not limited to, completion of a heating task of a microwave oven, door of a refrigerator remaining open for prolonged time, and a set temperature of an oven has been reached.

Hub device 312 is configured to receive the status information from one or more home appliance 314 via communication links 315, produce a status signal representative of the status information, and transmit the status signal to apparatus 102, such as the gateway device, via communication link 313. The status signal represents the status information. In one embodiment, hub device 312 is a home automation hub. Hub device 312 is a center into which all of one or more home appliance 314 are tied, and provides an interface between the one or more home appliance and apparatus 102.

In various embodiments, apparatus 102 includes a wireless gateway device. In various embodiments, the wireless gateway device is implemented in a cellular phone including a smartphone, a computer, a cell phone/entertainment device (CPED), or any gateway device discussed in this document. In one embodiment, hub device 312 is physically integrated into apparatus 102. In other embodiments, hub device 312 and apparatus 102, such as the wireless gateway device, are physically separate devices.

In one embodiment, apparatus 102 includes one or more inputs/outputs 104 configured to receive the status signal from hub device 312, such as via a wired link or a wireless link. Processor 108 is configured to process the status signal to produce output 109. Output 109 is adapted to be played via audio to the wearer of HAD 110. In one embodiment, output 109 is further adapted to interrupt a current audio stream being played to the wearer of HAD 110. In one embodiment, processor 108 is configured to make intelligent decisions when processing the status signal, such as selectively providing status information to the wearer using predetermined or user-selected criteria. This allows the wearer to decide, for example, which appliance(s) to monitor and/or which state(s) to be informed.

In an example of application of system 330, smart microwave oven connects to a home automation hub (e.g., the SmartThings Hub by SmartThings, Washington, D.C.) to transmit its state. When the microwave oven completes a cooking task, it sends an alert signal to the hub, which relays the alert signal to the wireless gateway device. The gateway device in turn informs the wearer through a hearing aid. This allows a hearing aid wearer to be confident in knowing when the cooking is done.

In one embodiment, system 330 can be combined with a geo-location system to warn the wearer of the hearing assistance device when the wearer leaves home with certain appliances, such as range or oven, on. While the wearer can be alerted to this on a smartphone itself, considering the fact that the broad demographic of the wearers are part of the older generation, they will likely pay more attention to something their hearing aids are telling them.

Figure 4:
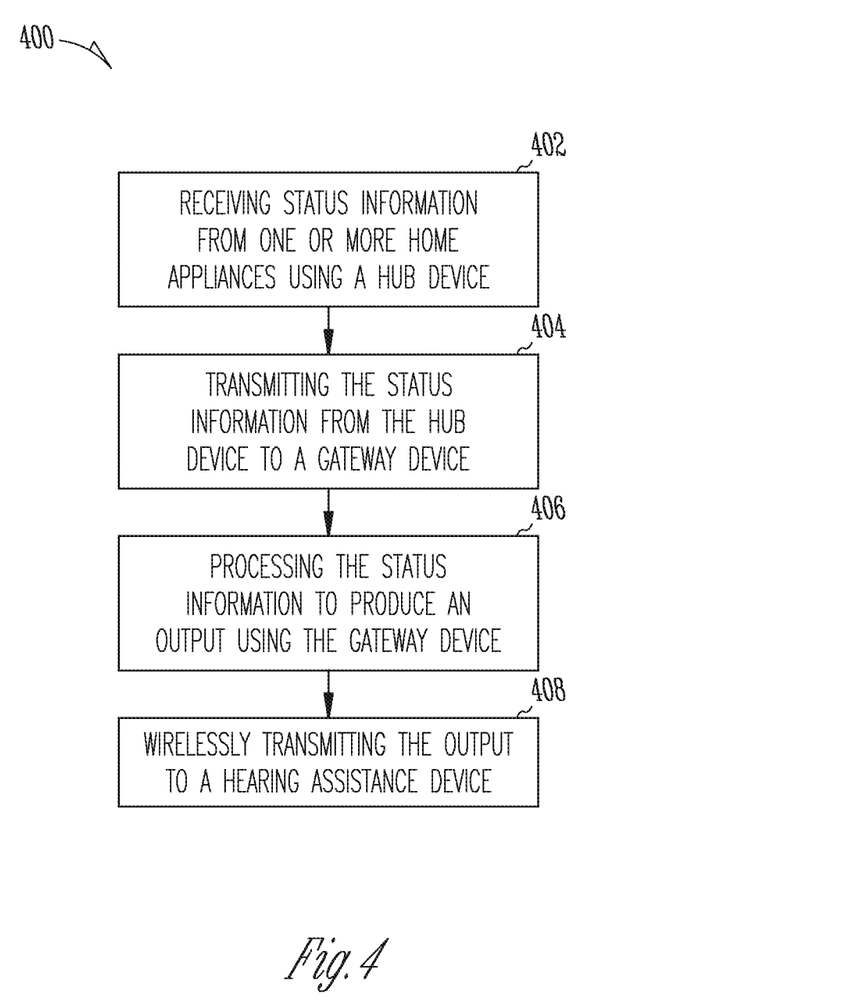
FIG. 4 illustrates a flow diagram of a method for wireless communication from one or more home appliances to a hearing assistance device, according to one embodiment of the present subject matter.

FIG. 4 illustrates a flow diagram of a method 400 for wireless communication between one or more home appliances and a hearing assistance device, according to one embodiment of the present subject matter. In one embodiment, system 330 is configured to perform method 400.

At 402, status information from the one or more home appliances is received using a hub device. The status information is indicative of a status of each home appliance of the one or more home appliances. In one embodiment, the status information is wirelessly transmitted from the one or more home appliances using an open communication protocol. Examples of the open communication protocol include Zigbee, Z-wave, Bluetooth, Bluetooth Low Energy (BLE), Bluetooth Basic Rate (BR), WiFi, any other Internet of Things (IOT) protocols, protocols from the IEEE 802.11 and IEEE 802.15 family of standards, and proprietary protocols.

At 404, the status information is transmitted from the hub device to a gateway device. In one embodiment, the status information is transmitted from the hub device to a gateway device via a wired link. In another embodiment, the status information is transmitted from the hub device to a gateway device via a wireless link. Examples of the gateway device include, but are not limited to, cellular phone, smartphone, and computer with application software providing for interface with the hearing assistance device.

At 406, the status information is processed to produce an output using the gateway device. The output is adapted to be played via audio by the hearing assistance device to the wearer. In one embodiment, the output is further adapted to interrupt a current audio stream being played by the hearing assistance device to the wearer. In one embodiment, the status information is processed to produce an output selectively relaying the status information to the wearer of the hearing assistance device.

At 408, the output is wirelessly transmitted from the gateway device to the hearing assistance device. The output is played via audio by the hearing assistance device to its wearer.

While home appliances are discussed with reference to FIGS. 3 and 4 as a specific example, the present subject matter can be applied to any other devices communicatively coupled to a hearing assistance device and having status information that the wearer of the hearing assistance device may want to receive.

Figure 5:
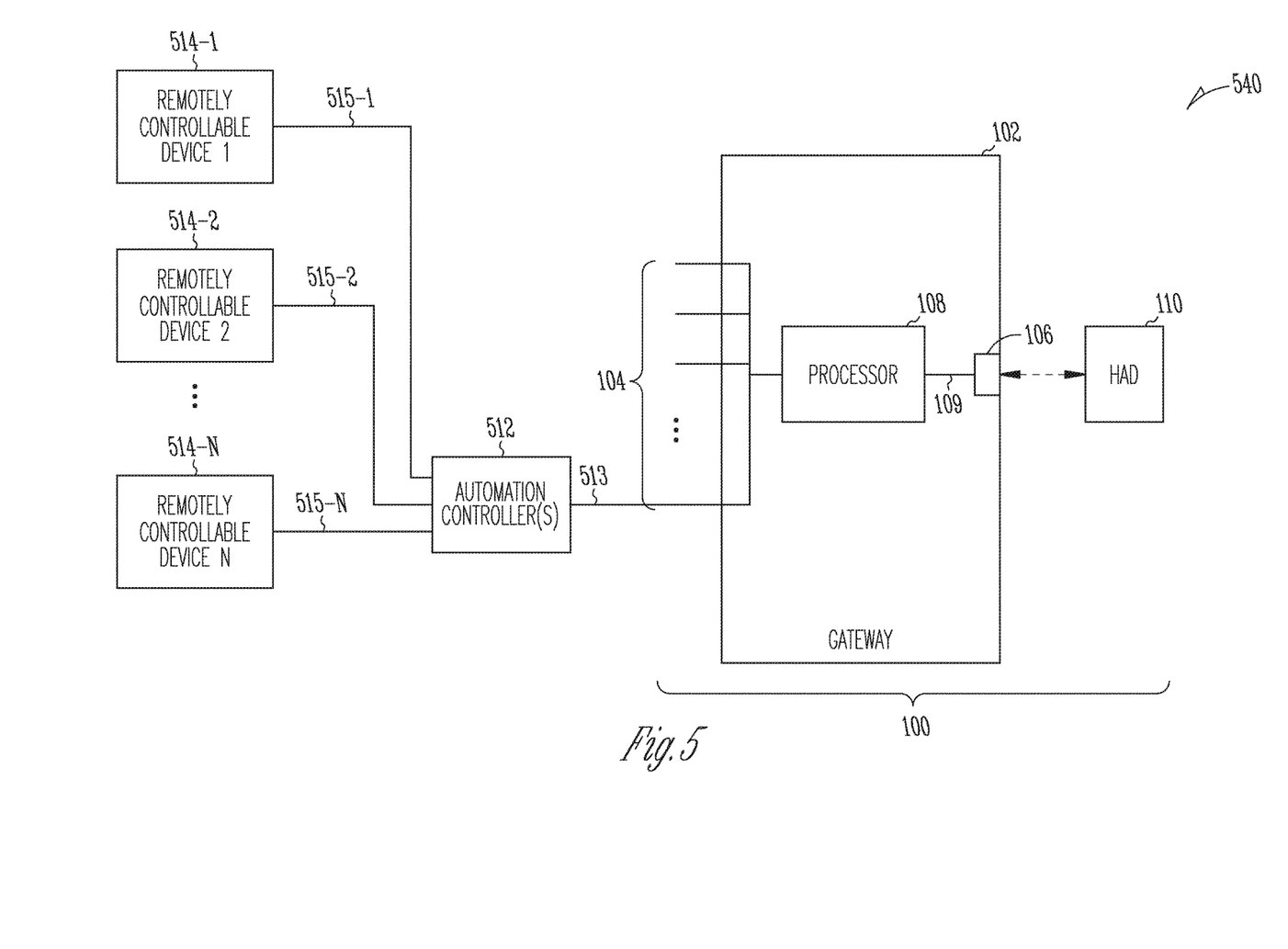
FIG. 5 illustrates a block diagram of a system providing for wireless communication between one or more remotely controllable devices and a hearing assistance device, according to one embodiment of the present subject matter.

FIG. 5 illustrates a block diagram of a system 540 providing for wireless communication between one or more remotely controllable devices and a hearing assistance device, according to one embodiment of the present subject matter. System 540 includes one or more automation controllers 512 providing for an interface between one or more remotely controllable devices 514 and system 100, thus allowing for communication from a wearer of HAD 110 to one or more remotely controllable devices 514. While a plurality of remotely controllable devices 514-1 to 514-N is shown in FIG. 5 for illustrative purposes, one or more remotely controllable devices 514 may include any number of remotely controllable devices (i.e., N≥1). In one embodiment, one or more remotely controllable devices 514 include one or more home appliances 314, and one or more automation controllers 512 include the functions of hub device 312.

In various embodiments, one or more remotely controllable devices 514 are each configured to receive one or more control signals from one or more automation controllers 512 via one of one or more communication links 515. Device 514-1 is communicatively coupled to one of automation controller(s) 512 via communication link 515-1, device 514-2 is communicatively coupled to one of automation controller(s) 512 via communication link 515-2 . . . , and device 514-N is communicatively coupled to one of the controller(s) 512 via communication link 515-N. In one embodiment, one or more remotely controllable devices 514 are each configured to receive one or more control signals wirelessly using an open communication protocol. The one or more control signals are representative of one or more voice commands given by the wearer for controlling the operation of each of the one or more remotely controllable devices 514.

One or more automation controllers 512 are configured to receive the one or more control signals from apparatus 102 via a communication link 513, and route the one or more control signals to one or more remotely controllable devices 514 via one or more communication links 515. One or more automation controllers 512 function as a center into which all of one or more remotely controllable devices 514 are tied, and provide an interface between the one or more remotely controllable devices and apparatus 102. In one embodiment, any or all of one or more automation controllers 512 may be physically integrated into apparatus 102. In other embodiments, one or more automation controllers 512 and apparatus 102, such as the wireless gateway device, are physically separate devices.

In one embodiment, apparatus 102 includes one or more inputs/outputs 104 configured to transmit the one or more control signals to one or more automation controllers 512, such as via a wired link or a wireless link 513. Processor 108 is configured to process a command signal received from HAD 110 and produce the one or more control signal based on the command signal. HAD 110 receives a voice command from the wearer, produces the one or more control signals based on the voice command, and transmits the one or more control signals to apparatus 102.

Figure 6:
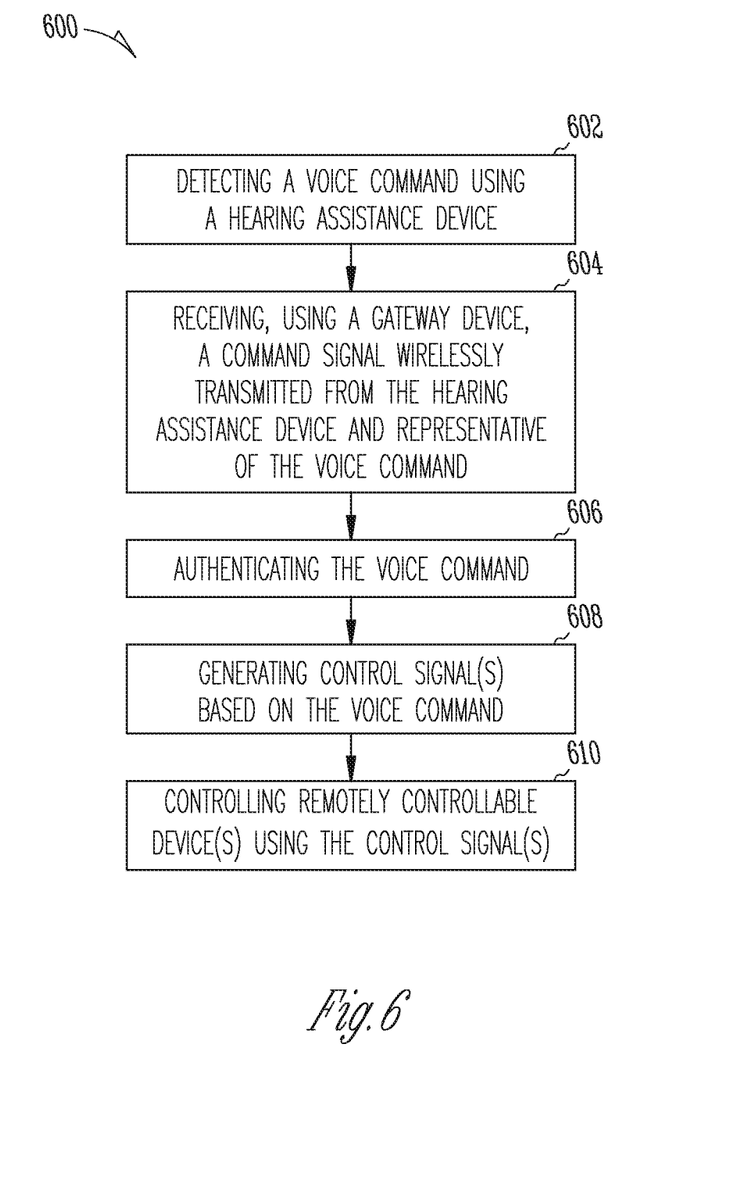
FIG. 6 illustrates a flow diagram of a method for wireless communication between one or more remotely controllable devices and a hearing assistance device, according to one embodiment of the present subject matter.

FIG. 6 illustrates a flow diagram of a method 600 for wireless communication between one or more remotely controllable devices and a hearing assistance device, according to one embodiment of the present subject matter. In one embodiment, system 540 is configured to perform method 600. In another embodiment, system 540 is configured to perform both methods 400 and 600.

At 602, s voice command is detected by the hearing assistance device. The hearing assistance device produces a command signal representative of the detected voice command. In various embodiments, the voice of the wearer is detected and recognized by the hearing assistance device, and the voice command is detected from the voice recognized to be the voice of the wearer. In various embodiments, the voice command includes one or more predetermined words or other sounds, and the hearing assistance device is trainable for recognizing such one or more one or more predetermined words or other sounds for being detected as the voice command.

At 604, the command signal is received using a gateway device. The command signal is wirelessly transmitted from the hearing assistance device.

At 606, the voice command is authenticated. In one embodiment, the authentication is performed by the hearing assistance device (so step 606 is performed before step 604). In another embodiment, the authentication is performed by the gateway device. In still other embodiments, the authentication is performed by one or more of the hearing assistance device, the gateway device, and other devices in a system such as system 540. In various embodiments the authentication of the voice command can be performed by using biometrics and/or unique voice metrics of the wearer or other authorized user to verify that the voice command is from the wearer or other authorized user. The authentication of the voice command may serve as a safety and/or security feature preventing unauthorized persons from controlling the one or more remotely controllable devices using voice commands.

At 608, one or more control signals are generated by the gateway device based on the voice command. In various embodiments, one or more control signals are routed by the gateway device to one or more devices of the one or more remotely controllable devices selected according to the voice command. For example, if the voice command is for operating a particular microwave oven, the one or more control signals are routed to that microwave oven.

At 610, the one or more remotely controllable devices are controlled using the one or more control signals. In various embodiments, the one or more remotely controllable devices are controlled using the one or more control signals by at least one automation controller communicatively coupled to the gateway device. In one embodiment, the one or more control signals are wirelessly transmitted from the automation controller to the one or more remotely controllable devices using an open communication protocol.

Examples communication protocols for various wireless communications performed in method 600 include Zigbee, Z-wave, Bluetooth, Bluetooth Low Energy (BLE), Bluetooth Basic Rate (BR), WiFi, any other Internet of Things (IOT) protocols, and protocols from the IEEE 802.11 and IEEE 802.15 family of standards. Proprietary communication protocols may also be used for the various wireless communications performed in method 600.

An example of the automation controller includes a home automation controller (or home automation hub such as the SmartThings Hub) of a home automation system that includes at least one remote controllable device of the one or more remotely controllable devices. Method 600 may be applied to control, for example, one or more lights, one or more heating, ventilation, or air-conditioning devices, and one or more home appliances. Another example of the automation controller includes an automotive automation controller of an automotive automation system that includes at least one remote controllable device of the one or more remotely controllable devices. Method 600 may be applied to control, for example, doors, windows, wipes, lights, a global positioning system (GPS) navigator, an audio system, and/or a climate controller of an automobile.

In various embodiments, method 600 can be performed in combination with a method for wirelessly transmitting status information from the one or more remotely controllable devices to the hearing assistance device, such as method 400 (but not limited to one or more home appliances). In various embodiments, the present subject matter provides for two-way communication between the one or more remotely controllable devices and the hearing assistance device via the gateway device. This allows, for example, the wearer to issue a voice command for operating a remotely controllable device using the hearing assistance device and monitors the response of the remotely controllable device to that voice command using the hearing assistance device.

Figure 7:
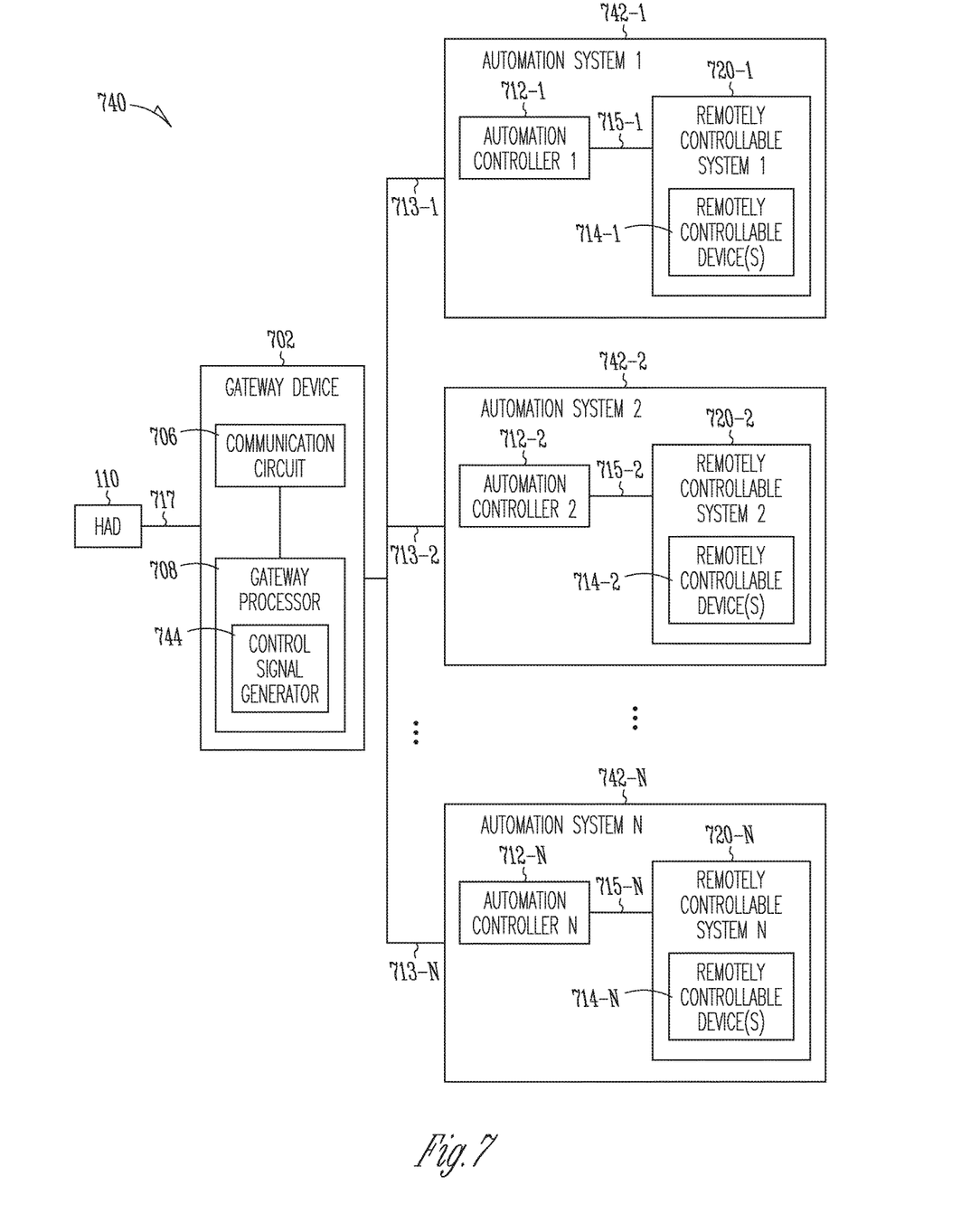
FIG. 7 illustrates a block diagram of a system including a hearing assistance device and one or more automation systems controllable using the hearing assistance device, according to one embodiment of the present subject matter.

FIG. 7 illustrates a block diagram of a system 740 including a hearing assistance device and one or more automation systems controllable using the hearing assistance device, according to one embodiment of the present subject matter. System 740 represents an embodiment of system 540 and includes HAD 110, a gateway device 702 configured to be communicatively coupled to HAD 110 via a wireless communication link 717, one or more automation systems 742 configured to be communicatively coupled to gateway device 702 via one or more wireless and/or wired communication links 713.

Gateway device 702 represents an embodiment of apparatus 102 and includes a communication circuit 706 and a gateway processor 708. Communication circuit 706 allows gateway device 702 to communicate with HAD 110 via wireless communication link 717 and communicate with one or more automation systems 742 via one or more wireless and/or wired communication links 713. Communication circuit 706 receives the command signal from HAD 110. Gateway processor 708 includes a control signal generator 744 that receives the command signal from communication circuit 706 and generates the one or more control signals based on the voice command. Communication circuit 706 receives the one or more control signals from gateway processor 708 and transmits the one or more control signals to one or more automation systems 742. In various embodiments, gateway processor 708 controls the routing of the one or more control signals according to the voice command represented by the command signal such that the one or more control signals are transmitted to the automation system(s) relevant to the voice command. In various embodiments, communication circuit 706 receives one or more feedback signals from one or more automation systems 742. The one or more feedback signals indicate one or more effects of the one or more control signals transmitted to one or more automation systems 742. Gateway processor 708 processes the one or more feedback signals to produce one or more notifications. Communication circuit 706 then transmits the one or more notifications to HAD 100 to inform the wearer of the effects of voice command. In various embodiments, the one or more feedback signals include one or more reminders. The one or more reminders may be generated by gateway processor 708 or one or more automation systems 742 as notifications for gross safety check purposes. Examples of such one or more reminders include an oven is on or reaches preheating temperature, a refrigerator door remains open for prolonged time, and house door remains unlocked).

While a plurality of automation systems 742-1 to 742-N is shown in FIG. 7 for illustrative purposes, one or more automation systems 742 may include any number of automation systems (i.e., N≥1). In various embodiments, one or more automation systems 742 each include an automation controller and a remotely controllable system that includes one of more remotely controllable devices. In the illustrated embodiment, automation system 742-1 includes an automation controller 712-1 communicatively coupled to gateway device 702 via communication link 713-1 and a remotely controllable system 720-1 communicatively coupled to automatic controller 712-1 via a wired or wireless communication link 715-1 and includes one or more remotely controllable devices 714-1; automation system 742-2 includes an automation controller 712-2 communicatively coupled to gateway device 702 via communication link 713-2 and a remotely controllable system 720-2 communicatively coupled to automatic controller 712-2 via a wired or wireless communication link 715-2 and includes one or more remotely controllable devices 714-2; . . . and automation system 742-N includes an automatic controller 712-N communicatively coupled to gateway device 702 via communication link 713-N and a remotely controllable system 720-N communicatively coupled to automation controller 712-N via a wired or wireless communication link 715-N and includes one or more remotely controllable devices 714-N. Automation controllers 712 receive the one or more control signals from gateway device 702 and control the remotely controllable devices 714 using the one or more control signals.

The block diagram shown in FIG. 7 may not necessarily reflect the physical arrangement of the elements of system 740. For example, gateway device 702 and one or more automation controllers 712 may be integrated into a single device or a plurality of devices communicating with each other via one or more wired and/or wireless communication links.

In one embodiment, one or more automation systems 742 include a home automation system. One or more automation controllers 712 include a home automation controller, such as hub device 312, that is communicatively coupled to a remotely controllable system with the one or more remotely controllable home devices. Examples of such one or more remotely controllable home devices include lights, electronic devices (such as radio, television set, and music player), home appliances (such as heater, fan, air conditioner, ventilator, laundry washer, and laundry dryer), kitchen appliances (such as stove, oven, microwave oven, and coffee maker). In various embodiments, system 740 may allow the wearer of HAD 110 to use voice commands to perform daily tasks in a house such as turning lights on and off, adjusting heating, and operate various home appliances.

In another embodiment, one or more automation systems 742 include an automotive automation system, such as a "hands-free car system". One or more automation controllers 712 include an automotive automation controller that is communicatively coupled to a remotely controllable system with the one or more remotely controllable automotive devices. Examples of such one or more remotely controllable automotive devices include doors, windows, alarm system, wipes, lights, music system, GPS navigation system, and climate controller. In various embodiments, system 740 may allow the wearer of HAD 110 to use voice commands to perform tasks related to a car such as locking and unlocking doors; activating and deactivating an alarm system, and controlling wipes, music system, GPS navigation system, climate control, high-beam/low-beam of headlights, etc. A better signal-to-noise ratio for receiving voice commands using a hearing aid when compared to a remote car microphone provide for an advantage to the hearing aid enhanced vehicle automation system. In one embodiment, one or more automation systems 742 allows for monitoring biometric data, heart rate, etc., of the hearing aid wearer. Such monitoring may be automatic deployed when needed, for example after a car accident. In one embodiment, one or more automation systems 742 link to OnStar® system (OnStar Corporation, Detroit, Mich., USA).

While the home automation system and the automotive automation system are discussed as specific examples, other examples of one or more automation systems 742 include a factory automation system, an office automation system, a hospital automation system, an aircraft automation system, and a medical device automation system. In various embodiments, one or more automation systems 742 may include any types of remotely controllable devices suitable for being controlled by voice commands.

In various embodiments, system 740 also allows for status information associated with each of one or more remotely controllable devices 714 to be communicated to HAD 110 and played to the wearer as an audible indicator or message. One or more automation controllers 712 receive a status signal from one or more remotely controllable devices 714 and transmit the status signal to gateway device 702. The status signal is indicative of a status of each device of one or more remotely controllable devices 714. Gateway processor 708 receives the status signal and generates a status output to be played via audio HAD 110. The status output is representative of the status signal. HAD 110 converts the status output into an audible indicator such as a predetermined tone and/or textual message and plays the audible indicator to the wearer. In various embodiments, the status signal may include confirmation of response to the voice command issued by the wearer. In various embodiments, the status signal may include information from one or more remotely controllable devices 714 that is not directly related to any voice commands issued by the wearer. Examples of such information in the automotive automation system include alerts and messages from a collision avoidance radar and traffic delay updates.

Figure 8:
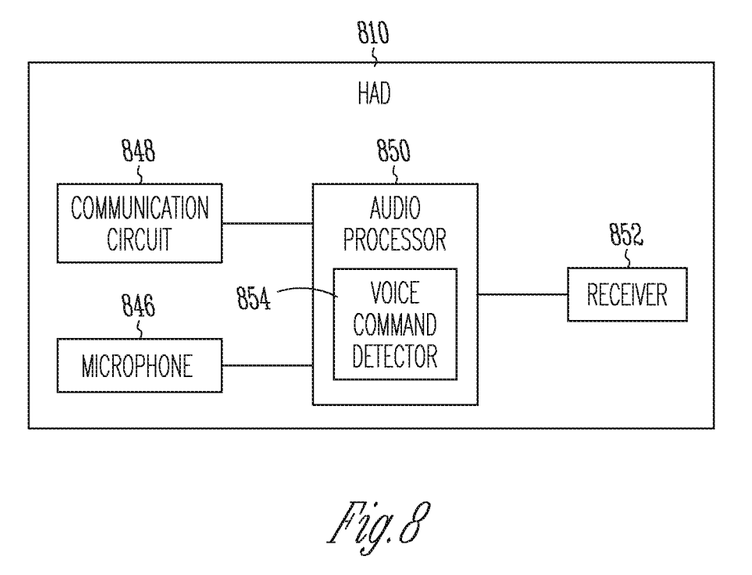
FIG. 8 illustrates a block diagram of a hearing assistance device, according to one embodiment of the present subject matter.

FIG. 8 illustrates a block diagram of a hearing assistance device (HAD) 810, according to one embodiment of the present subject matter. HAD 810 represents an embodiment of HAD 110 and includes one or more microphones 846, a communication circuit 848, an audio processor 850, and a receiver 852. Examples of HAD 810 include a hearing aid and a Bluetooth earbud with microphone.

One or more microphones 846 receive sounds from the environment of HAD 810 and produce one or more microphone signals representative of the received sounds. Audio processor 850 processes the one or more microphone signals and signals received by communication circuit 848 to produce an output signal. Receiver 852 produces output sounds based on the output signal and transmits the output sounds to the wearer of HAD 810.

Audio processor 850 includes a voice command detector 854 that detects the voice command from the one or more microphone signals and produces the command signal representative of the voice command. In various embodiments, voice command detector 854 detects voice of the wearer and detects the voice command from the detected voice of the wearer. Examples for detecting the voice of the wearer are discussed in U.S. Pat. No. 8,477,973, "HEARING ASSISTANCE SYSTEM WITH OWN VOICE DETECTION" and U.S. patent application Ser. No. 14/464,149, "HEARING- ASSISTANCE SYSTEM WITH OWN VOICE DETECTION" filed on Aug. 20, 2014, both assigned to Starkey Laboratories, Inc., which are incorporated by reference herein in their entireties. In various embodiments, voice command detector 854 is trained for recognizing various predetermined voice commands such as particular words and/or phrases spoken by the wearer. Such words and/or phrases may be associated with a particular operation of a particular device of one or more remotely controllable devices 714. Examples of such words and/or phrases include "living room lights off", "turning heating up by two degrees", "open driver's side door", and "increase speed of windshield wiper". In various embodiments, voice command detector 854 may confirm the voice command as detected with the wearer, such as by repeating the word and/or phrase as detected, before producing the command signal. In various embodiments, voice command detector 854 may ask the wearer to repeat the voice command if a word and/or phrase as detected is not recognizable as a predetermined voice command.

In various embodiments, for security purposes, each voice command is authenticated as being a verbal command issued by the wearer or another authorized user. This authentication can be performed by any one or more devices in system 740. In one embodiment, voice command detector 854 performs the authentication of the voice command. In another embodiment, voice command detector 854 relays the voice command to gateway device 702, and control signal generator 744 performs the authentication of the voice command. In various embodiments, voice command detector 854 of hearing aid 810, control signal generator 744 of gateway device 702, and/or automation controllers 712 perform the authentication of the voice command. Due to the limited space and/or other design constraints, more power speech recognition algorithms may be used when the authentication of the voice command is performed outside of HAD 810 (i.e., in gateway device 702 and/or automation systems 742. One embodiment uses a hybrid approach. HAD 810 makes a first attempt to authenticate the voice command. If the authentication by HAD 810 is unsuccessful or only partially successful, HAD 810 streams the detected voice command the gateway device 702 to be processed in gateway device 702. In this embodiment, gateway device 702 executes a speech detection algorithm that is more sophisticated and more powerful than that of HAD 810. Another embodiment uses a server on the Internet for even more sophisticated and powerful processing of the voice command for the authentication.

The authentication of the voice command can be performed by using biometrics and/or unique voice metrics of the wearer or other authorized user to verify that the voice command is from the wearer or other authorized user. The authentication of the voice command prevents speech of people other than the wearer and/or other authorized user from being recognized as a valid voice command, and prevents the present system from being operated by an unauthorized person.

In various embodiments, in addition to or in place of the authentication of the voice command, finger-print readers built into the shell of the hearing aid and/or other biometrics can also be used to identify the wearer or other authorized user. Once the voice command is authenticated, and/or the wearer or other authorized user is otherwise identified, HAD 810 can serve as a security device that allows the wearer and/or other authorized user streamlined access to homes, home-automation controls, automobiles, cellphones, computer, or any other electronically interfaced device requiring locking for security and/or privacy purposes. Such use of the hearing aid will significantly reduce time and hassle for providing physical keys and/or passwords to various electronically controlled systems with security provisions. For example, with voice command authentication, HAD 810 can be effectively used as a wireless security key for accessing secure control functions such as unlocking doors of automobiles, homes, etc.

Communication circuit 848 transmits the command signal to gateway device 702. In various embodiments, communication circuit 848 receives the status output from gateway device 702. Audio processor 850 produces a status indicator using the received status output and includes the status indicator in the output signal. Receiver 852 produces output sounds including the status indicator as the audible tone and/or textual message.

In various embodiments, the present subject matter allows wearers of hearing assistance devices more comfortable at home, car, or other living or working environments. It will also make hearing assistance devices such as hearing aids compatible with various automation systems.

Hearing assistance devices typically include at least one enclosure or housing, a microphone, hearing assistance device electronics including processing electronics, and a speaker or "receiver." Hearing assistance devices may include a power source, such as a battery. In various embodiments, the battery may be rechargeable. In various embodiments multiple energy sources may be employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing aids include a processor. In digital hearing aids with a processor (such as audio processor 850), programmable gains may be employed to adjust the hearing aid output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application can be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein can be created by one of skill in the art without departing from the scope of the present subject matter.

Various embodiments of the present subject matter support wireless communications with a hearing assistance device. In various embodiments the wireless communications can include standard or nonstandard communications. Some examples of standard wireless communications include, but not limited to, Bluetooth™, low energy Bluetooth, IEEE 802.11 (wireless LANs), 802.15 (WPANs), and 802.16 (WiMAX). Cellular communications may include, but not limited to, CDMA, GSM, ZigBee, and ultra-wideband (UWB) technologies. In various embodiments, the communications are radio frequency communications. In various embodiments the communications are optical communications, such as infrared communications. In various embodiments, the communications are inductive communications. In various embodiments, the communications are ultrasound communications. Although embodiments of the present system may be demonstrated as radio communication systems, it is possible that other forms of wireless communications can be used. It is understood that past and present standards can be used. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new protocols may be employed without departing from the scope of the present subject matter.

In various embodiments, the present subject matter is used in hearing assistance devices that are configured to communicate with mobile phones. In such embodiments, the hearing assistance device may be operable to perform one or more of the following: answer incoming calls, hang up on calls, and/or provide two way telephone communications. In various embodiments, the present subject matter is used in hearing assistance devices configured to communicate with packet-based devices. In various embodiments, the present subject matter includes hearing assistance devices configured to communicate with streaming audio devices. In various embodiments, the present subject matter includes hearing assistance devices configured to communicate with Wi-Fi devices. In various embodiments, the present subject matter includes hearing assistance devices capable of being controlled by remote control devices.

It is further understood that different hearing assistance devices may embody the present subject matter without departing from the scope of the present disclosure. The devices depicted in the figures are intended to demonstrate the subject matter, but not necessarily in a limited, exhaustive, or exclusive sense. It is also understood that the present subject matter can be used with a device designed for use in the right ear or the left ear or both ears of the wearer.

The present subject matter may also be employed in hearing assistance devices that are not specifically discussed above, such as headsets, headphones, and similar hearing devices.

The present subject matter may be employed in hearing assistance devices having additional sensors. Such sensors include, but are not limited to, magnetic field sensors, telecoils, temperature sensors, accelerometers and proximity sensors.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard fitted, open fitted and/or occlusive fitted. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. An apparatus for controlling an automation system including one or more remotely controllable devices using a hearing aid configured to be worn by a wearer and to detect a voice command from the wearer, comprising:

a communication circuit configured to receive a command signal from the hearing aid via a wireless first communication link, to transmit one or more control signals to the automation system via a second communication link; to receive one or more feedback signals from the automatic system via the second communication link, and to transmit one or more notifications to the hearing aid via the first communication link, the command signal representative of the voice command detected by the hearing aid, the one or more feedback signals indicative of one or more effects of the one or more control signals; and a processor configured to produce the one or more control signals for controlling at least one of the one or more remotely controllable devices based on the received command signal and to produce the one or more notifications for informing the wearer of the one or more effects of the one or more control signals based on the received one or more feedback signals.

2. The apparatus of claim 1, wherein the processor is configured to authenticate the voice command as being from the wearer and to generate the one or more control signals in response to the voice command being authenticated.

3. The apparatus of claim 1, comprising a gateway device including the communication circuit and the processor, and further comprising an automation controller communicatively coupled to the one or more remotely controllable devices and configured to control the at least one of the one or more remotely controllable devices using the one or more control signals.

4. The apparatus of claim 3, wherein the gateway device and the automation controller are integrated into a single device.

5. The apparatus of claim 3, wherein the gateway device is communicatively coupled to the automation controller via the second communication link being a wired link.

6. The apparatus of claim 3, wherein the gateway device is communicatively coupled to the automation controller via the second communication link being a wireless link.

7. The apparatus of claim 6, wherein the automation controller comprises a home automation controller configured to control one or more home appliances.

8. The apparatus of claim 6, wherein the automation controller comprises an automotive automation controller configured to control one or more automotive devices.

9. A method for controlling an automation system including one or more remotely controllable devices using a hearing aid configured to be worn by a wearer, comprising:
receiving a command signal from the hearing aid via a wireless first communication link, the command signal representative of a voice command from the wearer detected by the hearing aid;
producing one or more control signals based on the received command signal using a processor;
transmitting the one or more control signals to the automation system via a second communication link, the one or more control signals controlling at least one of the one or more remotely controllable devices;
receiving one or more feedback signals from the automatic system via the second communication link, the one or more feedback signals indicative of one or more effects of the one or more control signals;
producing one or more notifications based on the one or more feedback signals using the processor; and
transmitting the one or more notifications to the hearing aid, the one or more notifications informing the wearer of the one or more effects.

10. The method of claim 9, further comprising:
detecting voice of the wearer using the hearing aid; and
detecting the voice command from the detected voice of the wearer using the hearing aid.

11. The method of claim 9, further comprising:
authenticating the voice command as being from the wearer; and
producing the one or more control signals based on the authenticated voice command.

12. The method of claim 11, wherein authenticating the voice command comprises authenticating the voice command using the hearing aid.

13. The method of claim 12, further comprising confirming the detected voice command by repeating the voice command before producing the command signal using the hearing aid.

14. The method of claim 12, wherein authenticating the detected voice command comprises authenticating the detected voice command using biometrics of the wearer.

15. The method of claim 12, wherein authenticating the detected voice command comprises authenticating the detected voice command using metrics of voice of the wearer.

16. The method of claim 11, wherein authenticating the voice command comprises authenticating a device communicatively coupled to the hearing aid via the first communication link.

17. The method of claim 9, wherein transmitting the one or more control signals to the automation system comprises transmitting the one or more control signals to one or more of a home automation system, an automotive automation system, a factory automation system, or an office automation system.

18. The method of claim 17, wherein transmitting the one or more control signals to the automation system comprises transmitting the one or more control signals to a home automation controller, and further comprising controlling at least one home appliance using the home automation controller according to the one or more control signals.

19. The method of claim 17, wherein transmitting the one or more control signals to the automation system comprises transmitting the one or more control signals to an automotive automation controller, and further comprising controlling at least one device in an automobile using the automotive automation controller according to the one or more control signals.

20. The method of claim 9, wherein receiving the one or more feedback signals comprises receiving one or more reminders indicative state of operation of the one or more remotely controllable devices.

* * * * *